(12) United States Patent
Yaguchi (10) Patent No.: US 8,536,975 B2
(45) Date of Patent: Sep. 17, 2013

(54) HANDHELD TERMINAL AND CONTROL METHOD AND CONTROL PROGRAM THEREFOR

(75) Inventor: Yoshiharu Yaguchi, Kanagawa (JP)

(73) Assignee: Sony Mobile Communications, Inc., Tokyo (JP)

( * ) Notice: Subject to any disclaimer, the term of this patent is extended or adjusted under 35 U.S.C. 154(b) by 662 days.

(21) Appl. No.: 12/786,485

(22) Filed: May 25, 2010

(65) Prior Publication Data

US 2010/0302055 A1 Dec. 2, 2010

(30) Foreign Application Priority Data

Jun. 1, 2009 (JP) ................. P2009-132057

(51) Int. Cl.
*G05B 19/02* (2006.01)
*H04B 1/20* (2006.01)
*G08B 5/22* (2006.01)

(52) U.S. Cl.
USPC ............ 340/4.3; 340/4.37; 340/4.4; 340/7.62

(58) Field of Classification Search
USPC .................. 340/4.3, 4.37, 4.4, 7.62, 8.1, 988, 340/992; 84/723, 724, 725, 730, 737; 600/595; 702/160; 73/865.4
See application file for complete search history.

(56) References Cited

U.S. PATENT DOCUMENTS

| | | | | |
|---|---|---|---|---|
| 6,522,266 B1 * | 2/2003 | Soehren et al. | ................ | 340/988 |
| 7,135,637 B2 * | 11/2006 | Nishitani et al. | ................ | 84/723 |
| 7,499,232 B2 * | 3/2009 | Hodge et al. | .................... | 360/60 |
| 7,521,623 B2 * | 4/2009 | Bowen | ............. | 84/612 |
| 7,521,624 B2 * | 4/2009 | Asukai et al. | ................. | 84/612 |
| 7,544,880 B2 * | 6/2009 | Takai et al. | ..................... | 84/612 |
| 7,647,196 B2 * | 1/2010 | Kahn et al. | .................... | 702/149 |
| 7,790,976 B2 * | 9/2010 | Takai et al. | ..................... | 84/612 |
| 7,827,420 B2 * | 11/2010 | Wong et al. | ................... | 713/300 |
| 7,915,512 B2 * | 3/2011 | Fratti et al. | ..................... | 84/612 |
| 2006/0276919 A1 * | 12/2006 | Shirai et al. | .................... | 700/94 |
| 2007/0074619 A1 * | 4/2007 | Vergo | ............. | 84/612 |

FOREIGN PATENT DOCUMENTS

JP 2006 103520 4/2006
JP 2006 337505 12/2006

* cited by examiner

*Primary Examiner* — Nam V Nguyen
(74) *Attorney, Agent, or Firm* — Frommer Lawrence & Haug LLP; William S. Frommer (57) ABSTRACT

A control method for a handheld terminal, including the steps of: reproducing and outputting a piece of music in accordance with a reproduction list; detecting motion of the terminal in real space and determining whether or not the detected motion corresponds to a motion situation where the terminal is moving in real space; obtaining, on the basis of motion information derived from the motion of the terminal, the movement distance of the terminal in real space when the terminal is determined to be in a motion situation where the terminal is moving in real space; comparing the movement distance with a predetermined distance determination threshold and determining whether or not the movement distance exceeds the distance determination threshold; and changing the reproduction list of music to be reproduced, when the movement distance is determined to exceed the distance determination threshold.

5 Claims, 7 Drawing Sheets

HANDHELD TERMINAL AND CONTROL METHOD AND CONTROL PROGRAM THEREFOR

BACKGROUND OF THE INVENTION

1. Field of the Invention

The present invention relates to, for example, a handheld terminal, such as a mobile phone terminal including a music reproduction function, and a control method and a control program, both used for the handheld terminal.

2. Description of the Related Art

For example, Japanese Unexamined Patent Application Publication No. 2006-103520 proposes, in a car navigation system which includes a global positioning system (GPS) function, an information terminal device that automatically switches a reproduced piece of music by using location information obtained by the GPS function.

In addition, Japanese Unexamined Patent Application Publication No. 2006-337505 discloses a music reproduction device that recognizes a user's motion situation, for example, such as walking or running, by analyzing output of a motion sensor including an acceleration sensor or a gyroscopic sensor in a handheld terminal such as a mobile phone and is capable of selecting a piece of music and changing a tempo of a reproduced piece of music in response to the motion situation.

SUMMARY OF THE INVENTION

Recently, services based on mobile-phone terminals have been provided. In one of the services, for example, when a user carrying the terminal is jogging or walking, a moving route based on the jogging or the like is displayed or burned calories based on the jogging or the like are calculated and displayed.

When the user receives the service, in the mobile phone terminal, positioning is performed by using an embedded GPS function and a great deal of data is transferred by performing data communication between the mobile phone terminal and a server on the user's Internet connection on the basis of the location information. Accordingly, the moving route based on the jogging or the like or the burned calories based on the jogging or the like are obtained. In addition, an additional service is provided in the service. In the additional service, when later the user has access to the server through a personal computer, data relating to the user's movement based on the jogging or the like is analyzed. Accordingly, a moving route and a movement distance, both obtained by the analysis, are displayed on the screen of the personal computer.

However, in these services, it is difficult to notify the user in real time and easily how far the user moves when the user actually has a jog or the like.

Here, if, in a handheld terminal including a music reproduction function, automatic switching of a reproduced piece of music can be performed in response to, for example, the movement distance, it would appear that the user can listen to music while walking or jogging and grasp a rough movement distance nearly in real time by using the automatic switching of a reproduced piece of music.

In this way, it would appear that the automatic switching of a reproduced piece of music in response to the movement distance can be performed by using location information, which is obtained by the GPS function, for example, in the same way as the technique described in Japanese Unexamined Patent Application Publication No. 2006-103520.

However, when the technique described in Japanese Unexamined Patent Application Publication No. 2006-103520 is used, an enormous quantity of map data on an in-vehicle GPS navigation system is necessary in order to calculate the movement distance. Therefore, the technique described in Japanese Unexamined Patent Application Publication No. 2006-103520 is not suitable to be installed in a handheld terminal such as, for example, a mobile phone terminal.

Namely, taking an amount of an installable embedded memory into consideration, it is difficult for the handheld terminal such as a mobile phone terminal to retain the enormous quantity of map data.

On the other hand, when the enormous quantity of map data or the like is obtained through a wireless network, it would appear that even the handheld terminal can calculate the movement distance by using the technique described in Japanese Unexamined Patent Application Publication No. 2006-103520. However, in this case, it is necessary for the handheld terminal to periodically communicate the enormous quantity of map data or the like through the wireless network. Therefore, there occurs a problem in which communication charges and communication traffic increase. Furthermore, when the technique described in Japanese Unexamined Patent Application Publication No. 2006-103520 is used, it is necessary for the handheld terminal to include a GPS function and periodically perform a positioning operation by using the GPS function.

In addition, in a technique described in Japanese Unexamined Patent Application Publication No. 2006-337505, automatic reproduction of a user's favorite piece of music is performed by measuring the user's motion situation on the basis of output of a motion sensor. However, since it is difficult to calculate the user's movement distance, it is also difficult to perform automatic switching of a piece of music in response to the movement distance.

Taking the above-mentioned circumstances, it is desirable to provide a handheld terminal and a control method and a control program, both used for the handheld terminal, in which the movement distance can be obtained simply and easily and the automatic switching of a reproduced piece of music can be performed in response to the movement distance, by using no GPS function and no map data.

According to an embodiment of the present invention, a handheld terminal includes a music reproduction section, a motion recognition section, a distance calculation section, a threshold determination section, and a reproduction-list changeover control section. The music reproduction section reproduces and outputs a piece of music in accordance with a reproduction list. The motion recognition section detects motion of the terminal in real space and determines whether or not the detected motion corresponds to a motion situation in which the terminal is moving in real space. The distance calculation section obtains, on the basis of motion information which is derived from the motion of the terminal and supplied from the motion recognition section, a movement distance of the terminal in real space when the motion recognition section determines that the terminal is in a motion situation in which the terminal is moving in real space. The threshold determination section compares the movement distance obtained by the distance calculation section with a predetermined distance determination threshold value and determines whether or not the movement distance exceeds the distance determination threshold value. The reproduction list control section changes the reproduction list of music to be reproduced by the music reproduction section, when the threshold determination section determines that the movement distance exceeds the distance determination threshold value. In this way, the handheld terminal according to an embodiment of the present invention deals with the above-mentioned problems.

Namely, according to an embodiment of the present invention, when a piece of music is reproduced and output in accordance with the reproduction list, the movement distance of the terminal is obtained on the basis of the motion of the terminal in real space and the reproduction list of music to be reproduced is changed in response to the movement distance.

DESCRIPTION OF THE PREFERRED EMBODIMENTS

Hereinafter, an embodiment of the present invention will be described with reference to figures.

In addition, in the embodiment, while a mobile phone terminal is described as an example of a handheld terminal according to the embodiment, as a matter of course, the descriptions are just examples and the embodiment is not limited to the examples.

[General Configuration of Mobile Phone Terminal]

Figure 1:
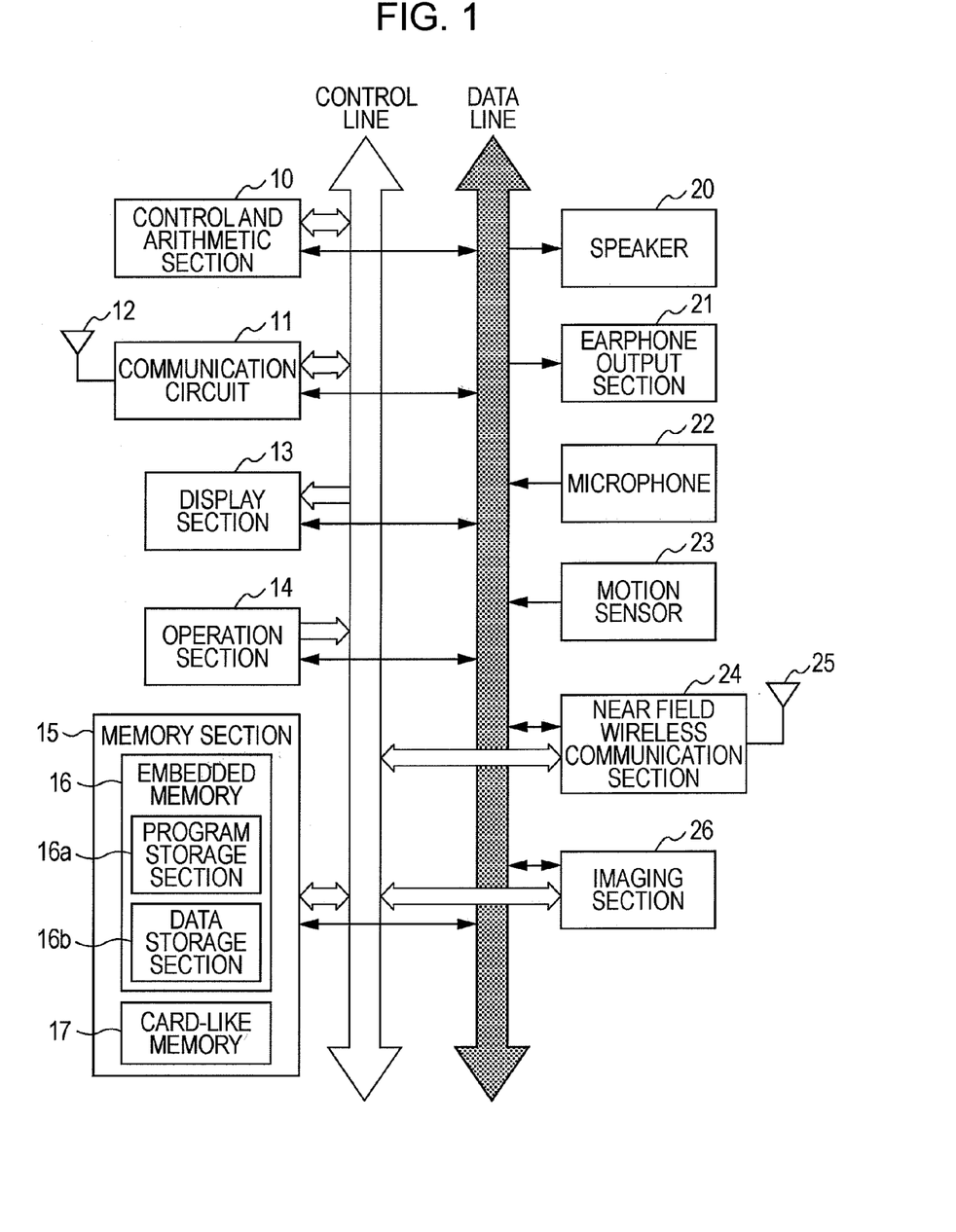
FIG. 1 is a block diagram schematically illustrating an example of an internal configuration of a mobile phone terminal according to an embodiment of the present invention.

FIG. 1 is a block diagram schematically illustrating an example of an internal configuration of a mobile phone terminal according to an embodiment of the present invention.

In FIG. 1, a communication antenna 12 is, for example, a built-in antenna and transmits and receives signal waves used for packet communication for phone calls and e-mails or the like. A communication circuit 11 frequency converts sent and received signals and modulates and demodulates the sent and received signals.

A speaker 20 corresponds to a speaker for a telephone receiver provided in the mobile phone terminal and a speaker for outputting a ringer (ring alert), an alarm tone, and reproduced music. Then, the speaker 20 converts an audio signal supplied from a control and arithmetic section 10 into an acoustic wave and outputs the acoustic wave into the atmosphere.

An earphone output section 21 includes an external earphone terminal. Then, when, for example, reproduction of music is performed under a condition in which an earphone is connected to the external earphone terminal and an audio signal is allowed to be output from the external earphone terminal, the earphone output section 21 transmits the reproduced music to the earphone through the external earphone terminal.

A microphone 22 is a microphone used for a telephone transmitter and collecting external sounds. Then, the microphone 22 converts an acoustic wave into an audio signal and sends the audio signal to the control and arithmetic section 10.

A motion sensor 23 includes an acceleration sensor and a gyroscopic sensor and detects an external force applied to the mobile phone terminal by oscillating motions or the like derived from, for example, a user's walking and running or the like. An output signal of the motion sensor 23 is sent to the control and arithmetic section 10.

Through a near field wireless communication antenna 25, a near field wireless communication section 24 performs near field wireless communication complying with, for example, a Bluetooth method or a wireless LAN method. In addition, the near field wireless communication section 24 performs general control of the near field wireless communication and transmission and reception of data to and from the control and arithmetic section 10.

An imaging section 26 is a digital camera used for imaging photo images. The imaging section 26 is capable of imaging not only still images but also moving images.

A display section 13 includes a display device such as, for example, a liquid crystal display or an organic electroluminescent (EL) display, and a display drive circuit used for driving the display device. Then, by using image signals supplied from the control and arithmetic section 10, the display section 13 displays, on the display device, an idle screen image and a calling image, various menu images, web browsing images, and various text such as e-mails.

An operation section 14 includes operating portions, which are provided on a chassis, not shown, of the mobile phone terminal according to the embodiment, such as a numerical keypad, a speech key, a call-ending/power key, an arrow key, and a touch sensor, and an operation signal generator used for generating operation signals when the operating portions are operated.

A memory section 15 includes an embedded memory 16 provided in the mobile phone terminal and a detachable card-like memory 17 used for storing so-called subscriber identity module (SIM) information or the like. The embedded memory 16 includes a read only memory (ROM) and a random access memory (RAM). The ROM includes a rewritable ROM such as a NAND-type or a NOR-type flash memory, or an electrically erasable programmable read-only memory (EEPROM) and stores, for example, an operating system (OS) program, a control program used by the control and arithmetic section 10 to control individual sections, various types of application programs, various types of initial setting values, dictionary data, and sound data such as a ring alert and key operation sound. In particular, in the embodiment, as one of the application programs, a distance-notification music reproduction control program (a control program of the embodiment) is prepared. The program calculates a movement distance and performs automatic switching control of a reproduced piece of music in response to the movement distance. In addition, the ROM is capable of storing music data and music playlist data, which are read out when a piece of music is reproduced, data to be displayed on the display, e-mail data, data for a telephone book and an e-mail address book, data for a schedule book, a communication history, various data, such as cache data, at the time of Internet connection, user dictionary data, data for still images and moving images, and various types of user setting values. In addition, in the example shown in FIG. 1, only a program storage section 16a and a data storage section 16b are graphically illustrated from among the various types of data and program storage areas in the embedded memory 16. The program storage section 16a retains the OS and an application program (in particular, the distance-notification music reproduction control program according to the embodiment) or the like. Then, the data storage section 16b retains music data and music playlist data, other sound data, various setting data used when the distance-notification music reproduction control program according to the embodiment is executed, and various types of data such as a telephone book and a schedule book. As a matter of course, while not graphically illustrated, in the memory section 15, storage areas used for dictionary data, initial setting values, still image data, and moving image data or the like are prepared. In addition, the RAM functions as a working area used by the control and arithmetic section 10 to perform various data processing and stores data appropriately.

The control and arithmetic section 10 includes a central processing unit (CPU) and performs control of communication performed in the communication circuit 11, audio and music processing and control of the audio and music processing, image processing and control of the image processing, other various types of signal processing, and control of individual sections. In addition, the control and arithmetic section 10 executes various types of control programs and application programs, which are stored in the memory section 15, and performs various types of data processing operations in association with these control programs and application programs. In particular, in the embodiment, by executing the distance-notification music reproduction control program stored in the program storage section 16a provided in the memory section 15, the control and arithmetic section 10 performs various types of processing operations for calculation of a movement distance, hereinafter described, and for automatic switching control of a reproduced piece of music in response to the movement distance.

In addition, while not graphically illustrated in FIG. 1, the mobile phone terminal according to the embodiment includes constructional elements provided in commonly used mobile phone terminals, such as a vibrator, a contactless communication section configured to perform contactless communication used by, for example, so-called radio frequency-identification (RFID) or a contactless IC card or the like, a light-emitting diode (LED) used for illumination, such as key illumination or calling light, and a drive section for the LED, a battery used for supplying power to individual sections and a power management IC section used for controlling the power, a slot for an external memory, a reception tuner and an AV codec section for digital broadcasting, and a timer (clock section). In addition, in the embodiment, the mobile phone terminal also includes a global positioning system (GPS) section configured to detect a current location by using satellite radio waves of the GPS.

[Configuration for Calculation of Movement Distance and Automatic Switching Control of Reproduced Music in Response to Movement Distance]

Figure 2:
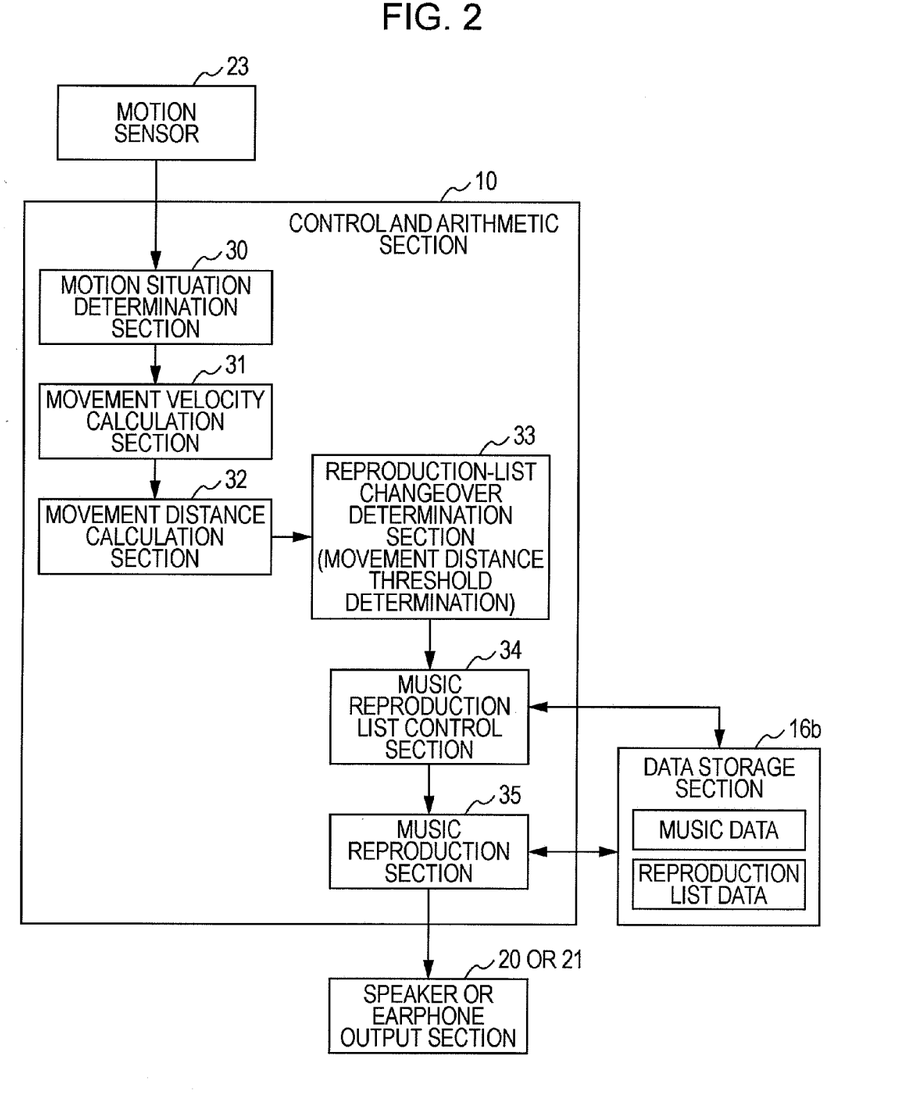
FIG. 2 is a functional block diagram schematically illustrating individual processing operations performed in a control and arithmetic section by executing a distance-notification music reproduction program.

FIG. 2 is a functional block diagram schematically illustrating individual processing operations for calculation of the movement distance and automatic switching control of reproduced music in response to the movement distance, the individual processing operations being performed in the control and arithmetic section 10 by executing the distance-notification music reproduction control program. Then, in FIG. 2, in addition to the individual functional blocks in the control and arithmetic section 10, the motion sensor 23, the speaker 20 or the earphone output section 21, the data storage section 16b included in the memory section 15, and a music data storage section 16c included in the data storage section 16b are also illustrated.

In FIG. 2, the output signal of the motion sensor 23 is supplied to a motion situation determination section 30 which is one of the functional blocks formed in the control and arithmetic section 10. The motion situation determination section 30 recognizes a motion situation of the mobile phone terminal on the basis of the output signal from the motion sensor 23. Namely, the motion situation determination section 30 analyzes, on the basis of the output signal from the motion sensor 23, what kind of external forces are applied to the mobile phone terminal and detects the motion situation of the mobile phone terminal on the basis of the analysis result.

In the embodiment, examples of motion situations determined by the motion situation determination section 30 include, for example, a motion situation in which the stopped movement of the user causes the mobile phone terminal to stop, a motion situation in which the mobile phone terminal is moving in accordance with the user's walking or running, a motion situation in which the movement of the mobile phone terminal is briefly stopped by the briefly stopped movement of the user who has been walking or running, a motion situation in which the movement of the mobile phone terminal is resumed by the resumed walking or running of the user who has briefly stopped, and other motion situations.

Namely, for example, when the user is walking or running, the user's motions have periodicity and the individual motions having the periodicity assume some definite directions. Furthermore, when the directions of these motions change periodically, the patterns of the changes assume some definite patterns. In addition, generally, depending on whether the user is walking such as in the case of an airing or is running such as in the case of jogging, the time intervals of periods of the motions, the directions of the individual motions having the periodicity, the patterns of the directional changes of the individual motions having the periodicity, and the magnitudes of the individual motions (magnitudes of accelerations or the like) having the periodicity differ. In addition, even if the user is walking, depending on whether the user is walking slowly or quickly such as in the case of competitive walking, namely, depending on walking speed, the time intervals of the periods, the directions of the individual motions, the patterns of the directional changes of the individual motions, and the magnitudes of the individual motions differ. In the same way, even if the user is running, depending on whether the user is running slowly such as in the case of jogging or quickly such as in the case of sprinting, namely, depending on running speed, the time intervals of the periods, the directions of the individual motions, the patterns of the directional changes of the individual motions, and the magnitudes of the individual motions differ.

Accordingly, the motion situation determination section 30 analyzes the output signal from the motion sensor 23 by using a correlation analysis or the like. Then, when the motion situation determination section 30 detects that the motions have the periodicity, the motion situation determination section 30 determines that the current motion situation of the mobile phone terminal is more likely to correspond to a motion situation in which the mobile phone terminal is moving in accordance with the user's walking or running. Furthermore, on the basis of the analysis result, the motion situation determination section 30 determines whether each of motion parameters approximately complies with any one of a plurality of motion parameters which individually correspond to various predetermined walking patterns or approximately comply with any one of a plurality of motion parameters which individually correspond to various predetermined run patterns, the motion parameters indicating the time intervals of periods of the motions, the directions of the individual motions having the periodicity, the patterns of the directional changes of the individual motions having the periodicity, and the magnitudes of the individual motions (magnitudes of accelerations or the like) having the periodicity, respectively. Accordingly, the motion situation determination section 30 determines how the user is walking or running.

On the other hand, even in the case in which motions having the periodicity are detected, when each of the motion parameters does not comply with any one of predetermined motion parameters for walking or running, the motion parameters indicating the time intervals of periods of the motions, the directions of the individual motions, and the patterns of the directional changes of the individual motions or the like, respectively, the motion situation determination section 30 determines that the motions having the periodicity do not correspond to the user's walking or running.

In addition, for example, when, in a motion situation in which the user is judged as walking or running, it is detected that, for example, the motion periodicity disappears and the motion itself substantially ceases, the motion situation determination section 30 detects that the motion situation turns out to be a motion situation in which the movement of the mobile phone terminal is briefly stopped by the briefly stopped movement of the user who has been walking or running. After that, when motions having the periodicity are detected and, furthermore, the time intervals of periods of the motions, the directions of the individual motions, the patterns of the directional changes of the individual motions, and the magnitudes of the motions or the like turn out to approximately comply with any one of predetermined motion parameters for walking or running, the motion situation determination section 30 recognizes that the motion situation turns out to be a motion situation in which the movement of the mobile phone terminal is resumed by the resumed walking or running of the user who has briefly stopped.

In addition, for example, when, after the distance-notification music reproduction control program is activated, the above-mentioned motion situation based on the user's walking or running is not yet detected or it is not detected that a motion situation based on the user's walking or running is resumed after a predetermined constant time elapses from the halt of a motion situation based on the user's walking or running, the motion situation determination section 30 recognizes that the mobile phone terminal is in a motion situation in which the movement of the mobile phone terminal is stopped completely.

Furthermore, for example, when, other than the above-mentioned motion situation based on the user's walking or running, a motion situation based on briefly stopped movement, and a motion situation based on completely stopped movement, other motions are detected, the motion situation determination section 30 recognizes that the mobile phone terminal is in a motion situation based on the other motions.

When, in the way mentioned above, the motion situation determination section 30 recognizes a motion situation, the motion situation determination section 30 determines whether or not the motion situation corresponds to a predetermined motion situation. Namely, in the embodiment, the motion situation determination section 30 determines whether or not the motion situation corresponds to a motion situation, as the predetermined motion situation, in which the user is walking or running. Then, when it is determined that the motion situation corresponds to the predetermined motion situation, the motion situation determination section 30 sends the individual motion parameters, which are detected when the motion situation is determined, to a movement velocity calculation section 31 as motion situation recognition information.

The movement velocity calculation section 31 is one of function blocks formed in the control and arithmetic section 10 and calculates the movement velocity of the mobile phone terminal on the basis of motion situation recognition information (individual motion parameters) which is supplied from the motion situation determination section 30 and relates to the predetermined motion situation based on the walking or running.

Here, generally, depending on whether a person is walking or running, the person's stride length differs. Furthermore, the person's stride length differs in accordance with the person's body height or leg length. In addition, when the person is walking, the person's stride length varies in response to the walking velocity. In the same way, when the person is running, the person's stride length varies in response to the running velocity. Namely, the stride length at the time of running is longer than the stride length at the time of walking. In addition, the stride length varies according to the walking velocity or the running velocity.

In addition, when the person is walking, the time per stride (namely, period) differs in response to the walking velocity. In the same way, when the person is running, the time per stride (period) differs in response to the running velocity. Namely, the time per stride (period) has a tendency to decrease with an increase in walking velocity or running velocity. On the other hand, the time per stride (period) has a tendency to increase with a decrease in walking velocity or running velocity.

In addition, furthermore, when the person is walking, the magnitude of a motion per stride (acceleration) differs in response to the walking velocity. In the same way, when the person is running, the magnitude of a motion per stride (acceleration) differs in response to the running velocity. Namely, the magnitude of a motion per stride (acceleration) has a tendency to increase with an increase in walking velocity or running velocity. On the other hand, the magnitude of a motion per stride (acceleration) has a tendency to decrease with a decrease in walking velocity or running velocity.

In other words, if the time per stride (period) or the magnitude of a motion per stride (acceleration) is determined at the time of walking or running, an approximate velocity at the time of walking or running can be estimated.

Accordingly, the movement velocity calculation section 31 calculates the movement velocity at the time of walking or running on the basis of the time per stride (period) based on walking or running, included in the motion situation recognition information supplied from the motion situation determination section 30, the magnitude of the periodical motion, also included in the motion situation recognition information, and predetermined stride lengths set for walking or running. In addition, examples of the predetermined stride lengths set for walking or running include stride lengths of an average male and an average female, a stride length selected by the user among a plurality of stride lengths, prepared with respect to each gender and body height (leg length), so that the selected stride length complies with the user's gender and body height (leg length), and a stride length arbitrarily input and set by the user.

Explaining with a concrete example, the movement velocity calculation section 31 estimates an approximate movement velocity on the basis of the time per stride (period) based on walking or running, included in the motion situation recognition information, and the magnitude of the periodical motion, also included in the motion situation recognition information, and adjusts, on the basis of the estimated movement velocity, the stride length at the time of walking or running. Then, the movement velocity calculation section 31 calculates the number of walk count per unit time on the basis of a period of one stride and calculates a movement distance per unit time, namely a movement velocity, by using the number of walk count per unit time and the adjusted stride.

The movement velocity calculation section 31 sends information relating to a movement velocity calculated, for example, in the way mentioned above to a movement distance calculation section 32.

The movement distance calculation section 32 is one of the function blocks formed in the control and arithmetic section 10. Then, the movement distance calculation section 32 integrates the movement velocity values obtained by the movement velocity calculation section 31 and calculates the movement distance based on the integral value. Namely, in the movement distance calculation section 32, a distance along which the mobile phone terminal moves in accordance with the user's walking or running is calculated.

In addition, when the user briefly stops walking or running, the motion situation determination section 30 also halts outputting the motion situation recognition information. Therefore, when the user briefly stops walking or running, calculation of the movement velocity is temporarily halted in the movement velocity calculation section 31 and calculation of the movement distance is also temporarily halted in the movement distance calculation section 32. Then, when the user resumes walking or running, the motion situation determination section 30 resumes outputting the motion situation recognition information. Therefore, calculation of the movement velocity is resumed in the movement velocity calculation section 31 and calculation of the movement distance is also resumed in the movement distance calculation section 32. In addition, in this case, the movement distance calculation section 32 performs a processing operation in which the movement distance calculated after resumption of the walking or the running is added to the movement distance calculated before temporal halt of the user's walking or running.

Information relating to the movement distance obtained by the movement distance calculation section 32 is sent to a reproduction-list changeover determination section 33.

The reproduction-list changeover determination section 33 compares the movement distance obtained by the movement distance calculation section 32 with a predetermined distance determination threshold value. Then, when the movement distance exceeds the distance determination threshold value, the reproduction-list changeover determination section 33 sends notification of change of a reproduction list to a music reproduction list control section 34 in a subsequent stage. In addition, examples of the distance determination threshold value include a value preliminarily and arbitrarily input and set by the user, a value arbitrarily selected and set by the user among a plurality of preliminarily prepared distance determination threshold values, and a value set, as a recommended value, by the distance-notification music reproduction control program.

On the other hand, a music reproduction section 35 is one of the function blocks formed in the control and arithmetic section 10. Then, on the basis of control performed by the music reproduction list control section 34, the music reproduction section 35 reads out music data stored in the data storage section 16a in the memory section 15, reproduces music signals, and outputs the music signals through the speaker 20 or the earphone output section 21.

The music reproduction list control section 34 is one of the function blocks formed in the control and arithmetic section 10. Then, on the basis of reproduction list information such as a music list and a playlist, stored in the data storage section 16a in the memory section 15, the music reproduction list control section 34 controls a music reproduction operation performed in the music reproduction section 35. Namely, for example, when the music list and the playlist are registered and a music reproduction is set to be performed according to the order of the music list or the playlist, the music reproduction list control section 34 causes the music reproduction section 35 to perform music reproduction according to these reproduction lists. In addition, for example, when random reproduction is set to be performed, the music reproduction list control section 34 can also cause the music reproduction section 35 to perform music reproduction in the random manner.

In addition, in the case in which the calculation of the movement distance and the automatic switching control of reproduced music in response to the movement distance are performed by executing the distance-notification music reproduction control program according to the embodiment, when the music reproduction list control section 34 receives the notification of change of the reproduction list from the reproduction-list changeover determination section 33, the music reproduction list control section 34 changes the reproduction list in response to the notification of change of the reproduction list. Then, the music reproduction list control section 34 causes the music reproduction section 35 to perform music reproduction according to the changed reproduction list.

Accordingly, in the music reproduction section 35, music reproduction is performed according to the changed reproduction list. Namely, a piece of music reproduced in the music reproduction section 35 is automatically switched every time the movement distance of the mobile phone terminal according to the embodiment exceeds the distance determination threshold value in accordance with the user's movement.

In addition, when the reproduced piece of music is switched, a switching method in which, for example, a piece of music corresponding to a reproduction list before the switching of reproduction is faded out and a piece of music corresponding to a new reproduction list after the switching of reproduction is faded in can be adopted. As a matter of course, after the piece of music corresponding to the reproduction list before the switching of reproduction is terminated, the music reproduction may be switched to the piece of music corresponding to the new reproduction list. In this regard, however, the time when the movement distance exceeds the distance determination threshold value may be somewhat out of alignment with the time when the piece of music is switched.

[Setting of Reproduction List and Setting of Movement Distance]

Figure 3A:
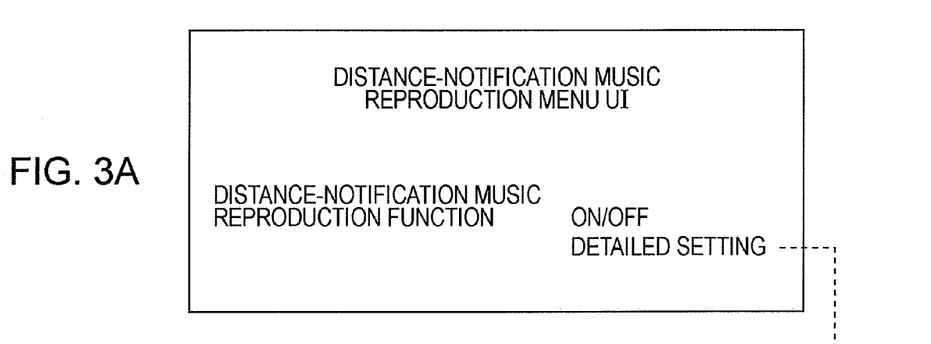
FIGS. 3A and 3B are diagrams illustrating examples of menu screens used for a setting of ON/OFF and detailed settings for a function which switches a reproduced piece of music in response to movement distances.

In FIG. 3A, an example of a user interface screen (an example of a menu screen) used by the user to perform a setting of ON/OFF and detailed settings for a function which switches a reproduced piece of music in response to the movement distances is illustrated. In addition, in FIG. 3B, as an example of the detailed settings, an example of a user interface screen (an example of a menu screen) used by the user to set distances corresponding to the distance determination threshold values and to set reproduction lists (pieces of music or playlists) switched in response to the distances corresponding to the distance determination threshold values is illustrated.

As shown in FIG. 3A, in the mobile phone terminal according to the embodiment, the user can arbitrarily set ON/OFF of a function for switching a reproduced piece of music in response to the movement distance, the function being performed when the distance-notification music reproduction control program is executed. Namely, in the embodiment, an icon used for setting ON/OFF of the function is displayed on the setting menu screen of the movement-distance-notification reproduction function. Then, the user can set any one of "ON" and "OFF" of the function on the setting menu screen of the movement-distance-notification reproduction function by operating the icon through, for example, the operation section 14. In addition, when "ON" is selected on the menu screen, the function for switching a reproduced piece of music in response to the movement distances is validated when the distance-notification music reproduction control program is executed. In addition, an icon used for shifting to the detailed setting menu screen is displayed on the setting menu screen. When the user selects the detailed setting icon through the operation section 14, the mobile phone terminal according to the embodiment performs transition to the menu screen shown in FIG. 3B.

Figure 3B:
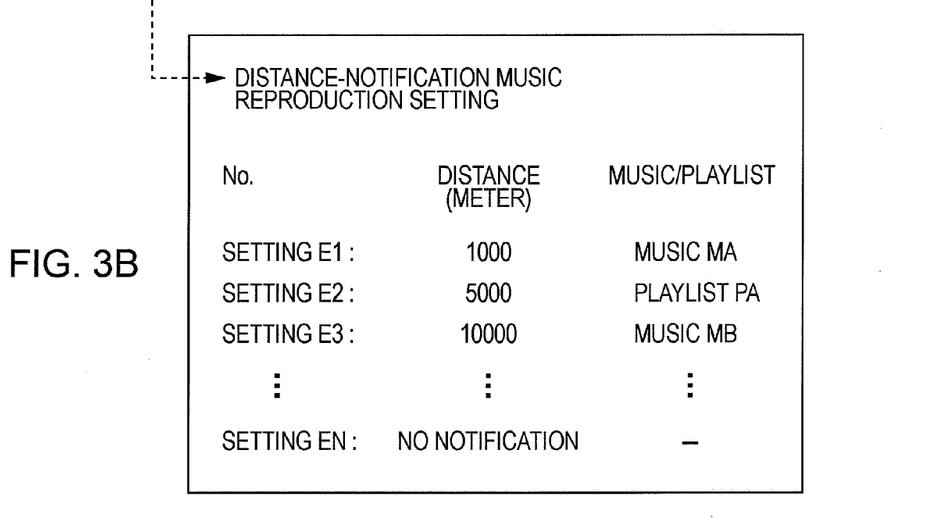

Setting numbers, distances set for individual setting numbers, and reproduction lists are displayed on the menu screen shown in FIG. 3B. The individual distance values are set when the user inputs an arbitrary value through the operation section 14 or selects a desired distance value among a plurality of distance values through the operation section 14. In addition, a piece of music or a playlist of the reproduction list is set when the user inputs an arbitrary piece of music or an arbitrary playlist through the operation section 14 or selects a desired piece of music or a desired playlist among a plurality of pieces of music or a plurality of playlists through the operation section 14.

In addition, in the example shown in FIG. 3B, as a setting E1, the distance is set to "1000" meters and the reproduction list is set to "music MA", and as a setting E2, the distance is set to "5000" meters and the reproduction list is set to "playlist PA". In addition, as a setting E3, the distance is set to "10000" meters and the reproduction list is set to "music MB", and, subsequently, no setting is registered. These various types of setting information are registered in the data storage section 16b in the memory section 15.

In the case in which the detailed setting values shown in FIG. 3B are registered, when the movement distance reaches 1000 meters after the distance-notification music reproduction control program is activated later, as described hereinafter, and, for example, the user begins to walk or run, the control and arithmetic section 10 in the mobile phone terminal according to the embodiment automatically reproduces the music MA. Next, when the movement distance reaches 5000 meters, the control and arithmetic section 10 automatically starts reproducing the playlist PA. After that, when the movement distance reaches 10000 meters, the control and arithmetic section 10 automatically starts reproducing the playlist MB.

In addition, in the case in which, as in the example, no setting is registered after the setting E3, after the movement distance reaches 10000 meters and the control and arithmetic section 10 automatically starts reproducing the playlist MB, the playlist MB may continue to be reproduced repeatedly or the music reproduction may be halted at the time of the termination of the playlist MB. As one of other settings, a setting in which from the setting E1 to the setting E3 are repeated may be registered.

In addition, while a movement based on walking is not discriminated from a movement based on running in the examples shown in FIGS. 3A and 3B, a setting of ON/OFF and detailed settings for the movement-distance-notification reproduction function validated only at the time of walking or a setting of ON/OFF and detailed settings for the movement-distance-notification reproduction function validated only at the time of running can be registered. In this case, for example, if the setting of ON/OFF and the detailed settings for the movement-distance-notification reproduction function are validated only at the time of walking, a reproduced piece of music is not switched in response to the movement distance when the user is running. On the other hand, for example, if the setting of ON/OFF and the detailed settings for the movement-distance-notification reproduction function are validated only at the time of running, a reproduced piece of music is not switched in response to the movement distance when the user is walking.

In addition, depending on whether the user is walking or running, detailed setting contents of the movement-distance-notification reproduction function can differ. In this case, even when the movement distance is the same, depending on whether the user is walking or running, a reproduced piece of music or a reproduced playlist can differ. Alternatively, a distance at which the reproduction list is switched at the time of walking can be different from a distance at which the reproduction list is switched at the time of running.

[Operation Control Flow when Distance-Notification Music Reproduction Control Program is Executed]

FIGS. 4 to 8 are flow charts schematically illustrating operation control performed, by executing the distance-notification music reproduction control program, in the control and arithmetic section 10 in the mobile phone terminal according to the embodiment.

First, in the case in which individual detailed setting values for the movement-distance-notification reproduction function have been already registered and the user instructs to use the detailed setting values, when the distance-notification music reproduction control program is activated, as a processing operation in Step S1, the control and arithmetic section 10 reads in the registered detailed setting values. In addition, in Step S1, when the detailed setting values for the movement-distance-notification reproduction function have not been registered yet, the control and arithmetic section 10 displays the above-mentioned setting menu screen, shown in FIG. 3, on the display of the display section 13 and prompts the user to input the individual detailed setting values. Then, after, in Step S1, the registered detailed setting values are read in or the user newly inputs detailed setting values through the operation section 14, the control and arithmetic section 10 proceeds with processing to Step S2.

Figure 4:
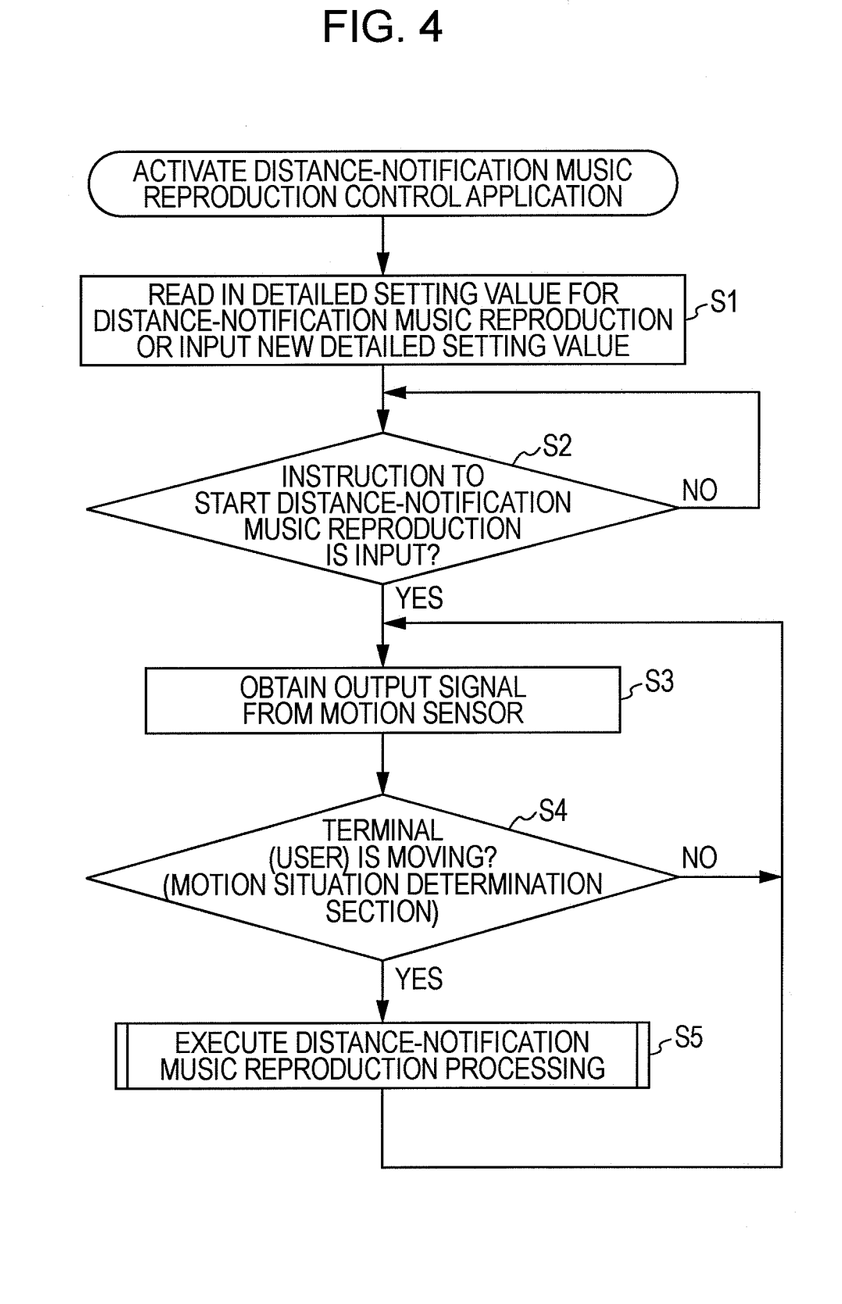
FIG. 4 is a flow chart schematically illustrating operation control performed, by executing the distance-notification music reproduction program, in the control and arithmetic section in the mobile phone terminal according to the embodiment.

When the control and arithmetic section 10 proceeds with processing to Step S2, the control and arithmetic section 10 monitors whether or not the user inputs, through the operation section 14, an instruction to start distance-notification music reproduction. Then, when the instruction is input, the control and arithmetic section 10 proceeds with processing to Step S3.

When the control and arithmetic section 10 proceeds with processing to Step S3, the control and arithmetic section 10 obtains an output signal from the motion sensor 23 and proceeds with processing to Step S4.

When the control and arithmetic section 10 proceeds with processing to Step S4, the control and arithmetic section 10 determines whether or not the user (namely, the terminal) is in a predetermined motion situation in which the user is moving in a walk or a run, by using the above-mentioned function of the motion situation determination section 30, shown in FIG. 2. Then, when the control and arithmetic section 10 determines that the user is not in the predetermined motion situation in which the user is moving in a walk or a run, the control and arithmetic section 10 returns processing to Step S3. On the other hand, when the control and arithmetic section 10 determines that the user is in the predetermined motion situation in which the user is moving in a walk or a run, the control and arithmetic section 10 proceeds with processing to Step S5.

Figure 5:
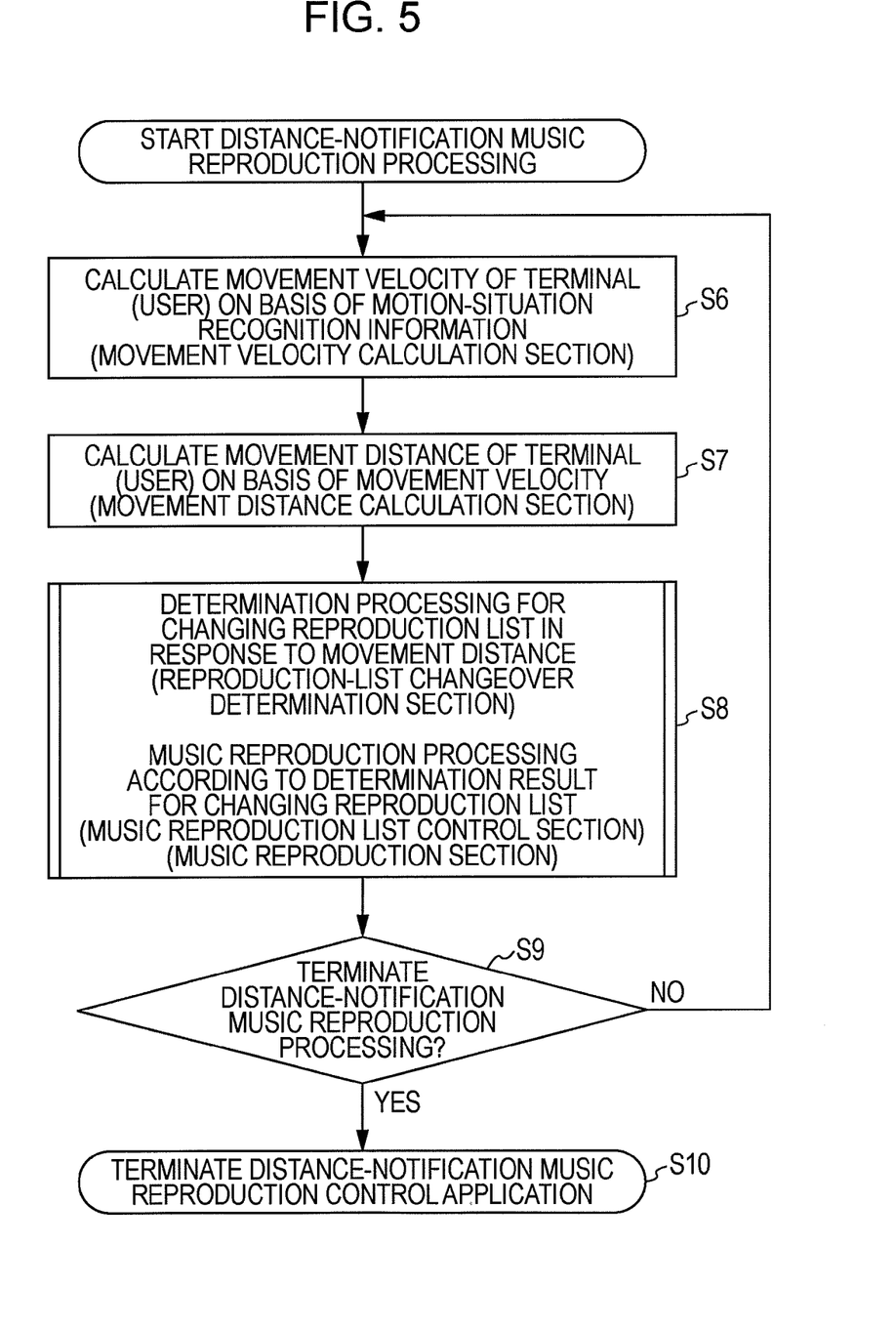
FIG. 5 is a flow chart minutely illustrating operation control performed in a distance-notification music reproduction processing operation shown in FIG. 4.

When the control and arithmetic section 10 proceeds with processing to Step S5, the control and arithmetic section 10 starts executing distance-notification music reproduction processing. FIG. 5 is a flow chart minutely illustrating the distance-notification music reproduction processing performed in Step S5 shown in FIG. 4.

When the control and arithmetic section 10 determines, in Step S4, that the user is in the predetermined motion situation in which the user is moving in a walk or a run, the control and arithmetic section 10 proceeds with processing to Step S6. Then, on the basis of the above-mentioned motion situation recognition information (individual motion parameters) obtained by the function of the motion situation determination section 30, the control and arithmetic section 10 calculates the movement velocity based on the user's (terminal's) walking or running by using the function of the movement velocity calculation section 31 shown in FIG. 2.

Then, as a processing operation in Step S7, on the basis of information relating to the movement velocity, the control and arithmetic section 10 calculates the movement distance by using the function of the movement distance calculation section 32 shown in FIG. 2.

Next, as a processing operation in Step S8, by using the function of the reproduction-list changeover determination section 32 shown in FIG. 2, the control and arithmetic section 10 performs determination processing for changing the reproduction list in response to the movement distance. In addition, as the processing operation in Step S8, by using the functions of the music reproduction list control section 34 and the music reproduction section 35, shown in FIG. 2, the control and arithmetic section 10 performs music reproduction processing according to the determination result for changing the reproduction list. Specific examples of the determination processing for changing the reproduction list in response to the movement distance and the music reproduction processing according to the determination result for changing the reproduction list which are performed in Step S8 shown in FIG. 5 will be described with reference to FIGS. 6 to 9.

FIGS. 6 to 9 are flow charts illustrating flows of processing operations, as an example, performed when the above-mentioned detailed settings shown in FIG. 3B are registered.

Figure 6:
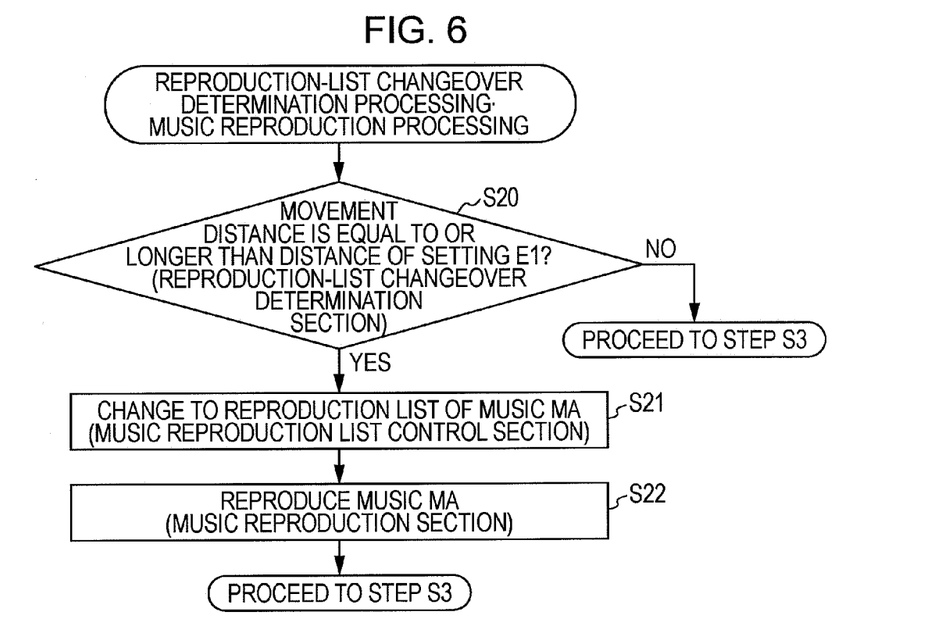
FIG. 6 is a flow chart specifically illustrating operation control performed in the distance-notification music reproduction processing operation according to a setting E1 shown in FIG. 3B.

In FIG. 6, in Step S20, by using the function of the reproduction-list changeover determination section 32, the control and arithmetic section 10 determines whether or not the movement distance becomes equal to or longer than the distance of the above-mentioned setting E1 ("1000" meters). In Step S20, when the movement distance is shorter than the distance of the setting E1, the control and arithmetic section 10 proceeds with processing to Step S3 in FIG. 4. On the other hand, when it is determined that the movement distance becomes equal to or longer than the distance of the setting E1, the control and arithmetic section 10 proceeds with processing to Step S21.

When the control and arithmetic section 10 proceeds with processing to Step S21, the control and arithmetic section 10 changes the reproduction list to the music MA by using the function of the music reproduction list control section 34. Next, as a processing operation in Step S22, the control and arithmetic section 10 performs reproduction of the music MA by using the function of the music reproduction section 35. After that, the control and arithmetic section 10 returns processing to Step S3 in FIG. 4.

Figure 7:
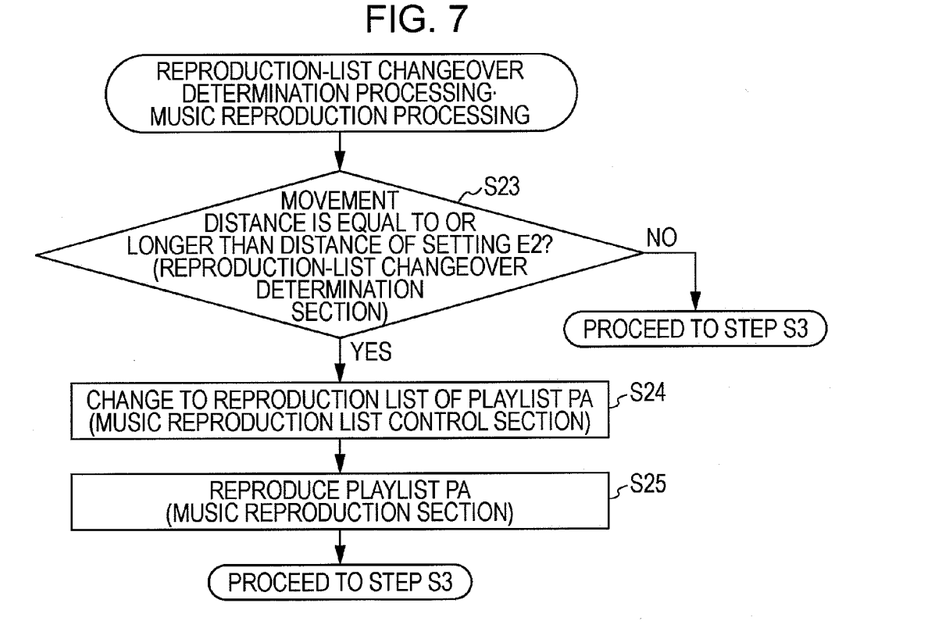
FIG. 7 is a flow chart specifically illustrating operation control performed in the distance-notification music reproduction processing operation according to a setting E2 shown in FIG. 3B.

Next, in FIG. 7, as a processing operation in Step S23, by using the function of the reproduction-list changeover determination section 32, the control and arithmetic section 10 determines whether or not the movement distance becomes equal to or longer than the distance of the above-mentioned setting E2 ("5000" meters). In Step S23, when the movement distance is shorter than the distance of the setting E2, the control and arithmetic section 10 returns processing to Step S3 in FIG. 4. On the other hand, when it is determined that the movement distance becomes equal to or longer than the distance of the setting E2, the control and arithmetic section 10 proceeds with processing to Step S24.

When the control and arithmetic section 10 proceeds with processing to Step S24, the control and arithmetic section 10 changes the reproduction list to the playlist PA by using the function of the music reproduction list control section 34. Next, as a processing operation in Step S25, the control and arithmetic section 10 performs reproduction of individual pieces of music in the playlist PA by using the function of the music reproduction section 35. After that, the control and arithmetic section 10 returns processing to Step S3 in FIG. 4.

Figure 8:
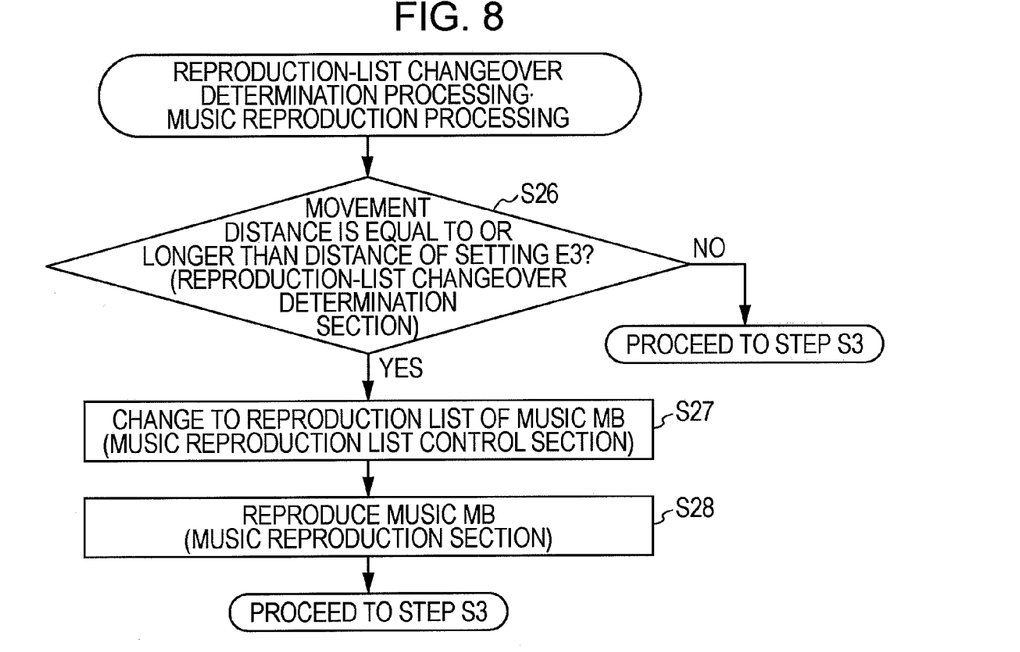
FIG. 8 is a flow chart specifically illustrating operation control performed in the distance-notification music reproduction processing operation according to a setting E3 shown in FIG. 3B.

Next, in FIG. 8, as a processing operation in Step S26, by using the function of the reproduction-list changeover determination section 32, the control and arithmetic section 10 determines whether or not the movement distance becomes equal to or longer than the distance of the above-mentioned setting E3 ("10000" meters). In Step S26, when the movement distance is shorter than the distance of the setting E3, the control and arithmetic section 10 returns processing to Step S3 in FIG. 4. On the other hand, when it is determined that the movement distance becomes equal to or longer than the distance of the setting E3, the control and arithmetic section 10 proceeds with processing to Step S27.

When the control and arithmetic section 10 proceeds with processing to Step S27, the control and arithmetic section 10 changes the reproduction list to the music MB by using the function of the music reproduction list control section 34. Next, as a processing operation in Step S28, the control and arithmetic section 10 performs reproduction of individual pieces of music in the music MB by using the function of the music reproduction section 35. After that, the control and arithmetic section 10 returns processing to Step S3 in FIG. 4.

Figure 9:
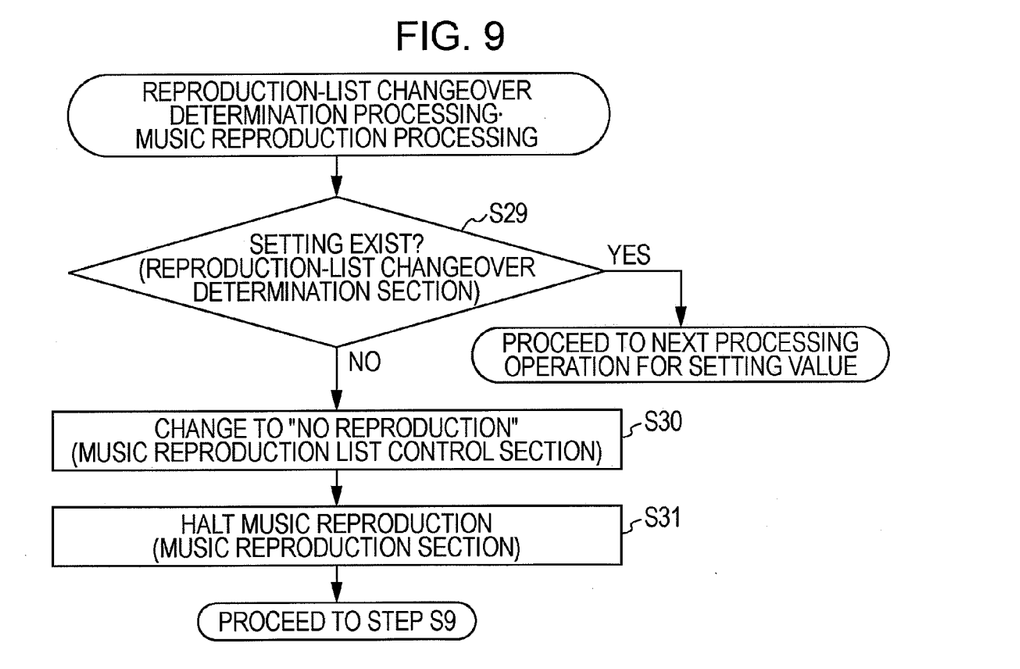
FIG. 9 is a flow chart specifically illustrating operation control performed in the distance-notification music reproduction processing operation when there is no registered setting value after the setting E3 shown in FIG. 3B.

Next, in FIG. 9, as a processing operation in Step S29, by using the function of the reproduction-list changeover determination section 32, the control and arithmetic section 10 determines whether or not a setting value is further registered.

In addition, in Step S29, when a setting value is further registered, the control and arithmetic section 10 proceeds with processing to a next processing operation for the setting value, the next processing operation being omitted from the flowchart. On the other hand, when it is determined that no setting value is further registered, the control and arithmetic section 10 proceeds with processing to Step S30.

When the control and arithmetic section 10 proceeds with processing to Step S30, the control and arithmetic section 10 changes the reproduction list to "none" by using the function of the music reproduction list control section 34. Next, as a processing operation in Step S31, the control and arithmetic section 10 halts music reproduction performed in the function of the music reproduction section 35. After that, the control and arithmetic section 10 returns processing to Step S9 in FIG. 5.

When the control and arithmetic section 10 proceeds with processing to Step S9 after returning to FIG. 5, the control and arithmetic section 10 determines whether or not the user inputs, through the operation section 14, an instruction to terminate the distance-notification music reproduction. Then, when the instruction is input, the control and arithmetic section 10 terminates the distance-notification music reproduction application.

EXAMPLES OF OTHER EMBODIMENTS

While, according to the embodiment, an example in which the user sets the reproduction list of music, which is switched in response to the distance, is described, the control and arithmetic section 10 may automatically generate a reproduction list corresponding to the distance, for example, by shuffling music database. As other examples, in response to the movement distance, a genre of music, a stereo channel, or a sound field may be switched or switching from a piece of music to other sound, for example, the sound of a radio or the voice of an educational material such as English conversation or the like, may be performed. Namely, in this case, examples of the reproduction list according to the embodiment include not only pieces of music and playlists but also genres of music, stereo channels, sound fields, and other sounds other than music (for example, the sound of a radio or the voice of an educational material such as English conversation or the like).

In addition, while, as one example of the embodiment, it is determined, on the basis of a detection signal detected by the motion sensor, whether or not the terminal is in a predetermined motion situation in which the user is moving or running, it may be determined whether or not the terminal is in the predetermined motion situation, for example, by detecting whether or not an access point is switched on the basis of, for example, the user's movement, the access point being used for near field wireless communication such as a wireless LAN or the like. Namely, in this case, in the case in which the access point is switched when the distance-notification music reproduction application is activated and the movement-distance-notification reproduction function is in execution, the motion situation determination section 30 determines that the mobile phone terminal is in a motion situation in which the mobile phone terminal is moving according to the user's movement. In addition, in this example, since installation positions for access points used for a wireless LAN or the like are preliminarily recognized, the movement velocity calculation section 31 can obtain time, which is taken for moving over the distance, on the basis of a distance between the installation position of an access point before the access point switching and the installation position of another access point after the access point switching and a time difference between a time when a previous access point switching was performed and a time when a current access point switching is performed. In addition, the movement velocity calculation section 31 can obtain the movement velocity on the basis of a movement distance per unit time. In addition, in this example, since the movement velocity is not exactly necessary, calculation of the movement velocity may be omitted in the movement velocity calculation section 31. Alternatively, the distance between the installation position of an access point before the access point switching and the installation position of another access point after the access point switching may be calculated, without modification, as the movement distance.

In addition, for example, it can be determined, for example, on the basis of external sounds captured by the microphone 22, whether or not the terminal is in a predetermined motion situation in which the user is moving or running. For example, when the user is moving or running, generally, the moving or the running generates periodical sounds. In addition, depending on whether the user is walking or running, generally, time intervals corresponding to the periods of the periodical sounds, the magnitude of the periodical sounds, and the patterns of the changes of the individual periodical sounds differ individually. In addition, depending on the velocity of walking or running, the time intervals corresponding to the periods, the magnitude of the sounds, and the patterns of the changes of the sounds differ. Accordingly, in the example, the motion situation determination section 30 analyzes the sounds detected by the microphone 22 by using a correlation analysis or the like. Then, when the motion situation determination section 30 detects that the sounds have the periodicity, the motion situation determination section 30 can determine that the current motion situation of the mobile phone terminal is more likely to correspond to a motion situation in which the mobile phone terminal is moving in accordance with the user's walking or running. Furthermore, in the example, on the basis of the analysis result, the motion situation determination section 30 determines whether each of motion parameters approximately complies with any one of a plurality of motion parameters which individually correspond to various predetermined walking patterns or approximately comply with any one of a plurality of motion parameters which individually correspond to various predetermined run patterns, the motion parameters indicating the time intervals corresponding to the periods of the sounds, the magnitude of the periodical sounds, and the patterns of the changes of the individual periodical sounds. Accordingly, the motion situation determination section 30 determines how the user is walking or running.

In addition, for example, it can be determined, for example, on the basis of moving images captured by the imaging section 26, whether or not the terminal is in a predetermined motion situation in which the user is moving or running. For example, when the user is moving or running, the moving images are captured while the lens of the imaging section 26 is pointed at, for example, the side and outer direction of the user's body or the user's traveling direction, in the condition in which the mobile phone terminal is attached to the user's arm, waist, or breast or a bag the user carries. Then, a motion situation in which the user is walking or running can be recognized by analyzing the moving images. Namely, when the user is walking or running, the moving images captured by the imaging section 26 are shaking and the shake has periodicity. Accordingly, on the basis of motion components obtained, for example, by using motion vector detection or the like, the periodicity of the moving images' shake, a time interval corresponding to the period, the magnitude of the moving images' shake, and the pattern of the change of the moving images' shake can be obtained from the moving images captured by the imaging section 26. Then, by using these parameters, it can be determined whether or not the terminal is in a predetermined motion situation in which the user is moving or running. More specifically, in the example, by using motion vector detection or the like, the motion situation determination section 30 analyses the shake of the moving images captured by the imaging section 26. Then, when it is detected that the shake of the moving images has periodicity, the motion situation determination section 30 can determine that the current motion situation of the mobile phone terminal is more likely to correspond to a motion situation in which the mobile phone terminal is moving in accordance with the user's walking or running. Furthermore, in the example, on the basis of the analysis result, the motion situation determination section 30 determines whether each of motion parameters approximately complies with any one of a plurality of motion parameters which individually correspond to various predetermined walking patterns or approximately comply with any one of a plurality of motion parameters which individually correspond to various predetermined run patterns, the motion parameters indicating the time intervals corresponding to the periods of the motions, the magnitude of the periodical motions, and the patterns of the changes of the individual periodical motions. Accordingly, the motion situation determination section 30 determines how the user is walking or running.

SUMMARY

As described above, according to the embodiment, on the basis of the output signal from the motion sensor 23 or the like, a predetermined motion situation in which the user is walking or running is detected and the movement distance based on the predetermined motion situation is calculated. Namely, since the mobile phone terminal according to the embodiment uses functions of mobile phone terminals such as a motion sensor or the like, the functions having already been widely in use, the mobile phone terminal can simply and easily calculate the distance, for example, by using no GPS function and no enormous quantity of map data. Furthermore, according to the embodiment, a reproduced piece of music is automatically switched in response to the movement distance. Therefore, when the user is enjoying music, the user can in real time and easily recognize how far the user moves with a walk or a jog, while a task such as, for example, confirmation of a display screen or the like is not necessary.

In addition, the description of the embodiment mentioned above is one of examples of the embodiment. Therefore, embodiments according to the present invention are not limited to the above-mentioned embodiment and the above-mentioned modification examples. Furthermore, various modifications can be applied to the above-mentioned embodiment and the above-mentioned modification depending on design requirements and other factors insofar as they are within the scope of the present invention. For example, while, in the embodiment mentioned above, the mobile phone terminal is described as a handheld terminal that the user carries, examples of handheld terminals according to the embodiment include, for example, a personal digital assistant (PDA), a wearable personal computer, a portable game device, a portable digital television receiver, and a portable navigational terminal.

The present application contains subject matter related to that disclosed in Japanese Priority Patent Application JP 2009-132057 filed in the Japan Patent Office on Jun. 1, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A handheld terminal comprising:
   a music reproduction section configured to reproduce and output a piece of music in accordance with a reproduction list;
   a motion recognition section configured to detect motion of the terminal in real space and determine, on the basis of the detected motion, whether or not the terminal is in a motion situation in which the terminal is moving in real space;
   a distance calculation section configured to obtain, on the basis of motion information which is derived from the motion of the terminal and supplied from the motion recognition section, a movement distance of the terminal in real space when the motion recognition section determines that the terminal is in a motion situation in which the terminal is moving in real space;
   a threshold determination section configured to compare the movement distance obtained by the distance calculation section with a predetermined distance determination threshold value and determine whether or not the movement distance exceeds the distance determination threshold value, the threshold determination section including a plurality of distance determination threshold values different from one another and compares the movement distance obtained by the distance calculation section with the plurality of distance determination threshold values; and
   a reproduction list control section configured to change the reproduction list of music to be reproduced by the music reproduction section, when the threshold determination section determines that the movement distance exceeds the distance determination threshold value; wherein the reproduction list control section changes the reproduction list of music to be reproduced by the music reproduction section, every time the threshold determination section determines that the movement distance exceeds each of the plurality of distance determination threshold values.

2. The handheld terminal according to claim 1, wherein the motion recognition section includes a motion sensor used for detecting an external force applied to the terminal and determines, on the basis of a detection signal corresponding to the external force detected by the motion sensor, whether or not the terminal is in a motion situation in which the terminal is moving in real space.

3. The handheld terminal according to claim 1, wherein the distance calculation section calculates a movement velocity of the terminal on the basis of the motion information supplied from the motion recognition section and calculates the movement distance by using an integral of the movement velocity.

4. A control method for a handheld terminal, comprising the steps of:
   causing a music reproduction section to reproduce and output a piece of music in accordance with a reproduction list;
   causing a motion recognition section to detect motion of the terminal in real space and determine whether or not the detected motion corresponds to a motion situation in which the terminal is moving in real space;

causing a distance calculation section to obtain, on the basis of motion information which is derived from the motion of the terminal and supplied from the motion recognition section, a movement distance of the terminal in real space when the motion recognition section determines that the terminal is in a motion situation in which the terminal is moving in real space;

causing a threshold determination section to compare the movement distance obtained by the distance calculation section with a plurality of distance determination threshold values different from one another and determine whether or not the movement distance exceeds the distance determination threshold value; and causing a reproduction list control section to change the reproduction list of music to be reproduced by the music reproduction section, every time the threshold determination section determines that the movement distance exceeds each of the plurality of distance determination threshold values.

5. A non-transitory computer readable medium on which is stored a control program configured to cause a handheld terminal to execute processing, the processing comprising:

a music reproduction processing operation for reproducing and outputting a piece of music in accordance with a reproduction list;

a motion recognition processing operation for detecting motion of the terminal in real space and determining whether or not the detected motion corresponds to a motion situation in which the terminal is moving in real space;

a distance calculation processing operation for obtaining, on the basis of motion information which is derived from the motion of the terminal and generated in the motion recognition processing operation, a movement distance of the terminal in real space when the motion recognition processing operation determines that the terminal is in a motion situation in which the terminal is moving in real space;

a threshold determination processing operation for comparing the movement distance obtained in the distance calculation processing operation with a plurality of distance determination threshold values different from one another and determining whether or not the movement distance exceeds the distance determination threshold value; and a reproduction list control processing operation for changing the reproduction list of music to be reproduced in the music reproduction processing operation, every time the threshold determination processing operation determines that the movement distance exceeds each of the plurality of distance determination threshold values.

* * * * *